United States Patent [19]
Kajiwara

[11] Patent Number: 4,903,936
[45] Date of Patent: Feb. 27, 1990

[54] THROTTLE VALVE ACTUATOR INCLUDING SEPARATE VALVE DRIVING DEVICES

[75] Inventor: Yasuya Kajiwara, Hyogo, Japan

[73] Assignee: Mitsubishi Denki Kabushiki Kaisha, Tokyo, Japan

[21] Appl. No.: 247,550

[22] Filed: Sep. 22, 1988

[30] Foreign Application Priority Data

Sep. 22, 1987 [JP] Japan .......................... 62-144597[U]
Oct. 22, 1987 [JP] Japan .......................... 62-268452
Dec. 4, 1987 [JP] Japan .......................... 62-308197

[51] Int. Cl.[4] .......................... F02D 9/10; F02D 11/10; F16H 37/14

[52] U.S. Cl. .......................... 251/14; 74/99 A; 74/513; 74/625; 123/399; 123/401; 251/58; 251/129.11; 251/129.03

[58] Field of Search .......................... 74/99 A, 513, 625; 123/360, 378, 361, 399, 401, 403; 251/14, 58, 129.03, 129.11; 180/178

[56] References Cited

U.S. PATENT DOCUMENTS 952,398 3/1910 Winton et al. .......... 251/248 X
1,318,399 10/1919 Manly .......... 123/401 X
2,585,814 2/1952 McDonald .......... 74/513
2,902,885 9/1959 Wright .......... 251/129.03 X
3,237,893 3/1966 Tonnies .......... 74/625 X
4,526,060 7/1985 Watanabe .......... 74/626
4,730,511 3/1988 Tsujimura .......... 74/99 A X
4,780,171 10/1988 Byerley .......... 74/99 A X

FOREIGN PATENT DOCUMENTS 1328909 4/1963 France .
59-25053 2/1984 Japan .
59-122742 7/1984 Japan .
61-215436 9/1986 Japan .
63-1724 1/1988 Japan .
88-02064 3/1988 World Int. Prop. O. .

*Primary Examiner*—Allan D. Herrmann
*Attorney, Agent, or Firm*—Sughrue, Mion, Zinn, Macpeak & Seas

[57] ABSTRACT

In a throttle valve actuator, there are provided a first spline gear driven by a motor in a sliding operation, a second spline gear meshed with the first spline gear for rotating a shaft of a throttle valve device, a housing for rotatably supporting the second spline gear. An accelerator pedal is connected via an accelerator wire and the housing to second spline gear so as to rotate the shaft of the throttle valve device. The sliding operation of the first spline gear does not give any force to the accelerator pedal via the houisng and second spline gear.

5 Claims, 10 Drawing Sheets

THROTTLE VALVE ACTUATOR INCLUDING SEPARATE VALVE DRIVING DEVICES

BACKGROUND OF THE INVENTION

1. Field of the Invention

The present invention generally relates to a throttle valve actuator used for controlling engine power of an automobile. More specifically, the present invention is directed to a throttle valve actuator mutually controlled by an accelerator pedal and also an electric motor.

2. Description of the Related Art

Various attempts have been made in a throttle valve actuator to control a throttle valve of an automobile. One of the conventional throttle valve actuators is disclosed in Japanese KOKAI (Disclosure) patent application No. 61-215436 (1986) filed by Mitsubishi Denki K.K. in Japan.

FIG. 1 shows a schematic diagram of the above-described conventional throttle valve actuator. Referring to FIG. 1, reference numeral 1 designates differential gears including a pair of opposed gears 2 and 3 and a pair of opposed gears 5 and 6 meshed with the gears 2 and 3. The gears 2 and 3 are rotatably supported to a shaft 4. A motor 7 is provided to rotate the gear 2 of the differential gears 1 through a gear 8. An accelerator pedal 9 is provided to rotate the gear 3 of the differential gears 1 through an accelerator wire 10, a pulley 11 and a gear 12 by depression force to be applied to the accelerator pedal 9. A gear 13 is mounted on a shaft 14 supporting the gears 5 and 6, and is meshed with a gear 15. A throttle valve 16 is operated through the gear 15 by the rotation of the gear 13.

When the accelerator pedal 9 is depressed, the accelerator wire 10 is drawn to rotate the pulley 11 and the gear 12 and thereby rotate the gear 3. At this time, when the motor 7 is in an inoperative condition, the gear 3 is rotated to rotate the gear 13 and the gear 15 and, thereby open and close the throttle valve 16. When the motor 7 and the accelerator pedal 9 are simultaneously operated, both driving forces thereof are outputted, or transported to the gear 13. Accordingly, the driving force of the gear 13 is the sum or difference between both the driving force of the motor 7 and of the accelerator pedal 9.

However, as the driving force of the motor 7 and the accelerator pedal 9 are applied in parallel to the same gear 13, a reaction of the torque of the motor 7 is transmitted to the accelerator pedal 9. As a result, when a car driver's foot is put on the accelerator pedal 9, a change in the depression force applied to the accelerator pedal 9 is felt through his foot on the pedal 9 by the driver because of the rotation of the motor 7, resulting in deterioration of the drive feeling, i.e., drivability.

Further, in the event that the motor 7 fails to operate, the throttle valve 16 cannot be returned from a controlled position upon occurrence of such motor malfunction to a valve closing position. Thus, the conventional actuator has a problem in fail-safe structure.

Additionally, when the accelerator pedal 9 is rapidly depressed under the condition where the throttle valve 16 is opened at a certain angle by the motor 7, there is a possibility of the throttle valve 16 biting a body 17. If a stopper is provided to prevent such body biting, a depression stroke of the accelerator pedal 9 is shortened to cause deterioration of the acceleration feeling.

The present invention has been achieved to solve the above-described conventional problems.

A primary object of the present invention is therefore to provide a throttle valve actuator which may eliminate the interference between the driving force of the motor and the depression force of the accelerator pedal.

It is a second object of the present invention to provide a throttle valve actuator which may ensure fail-safe construction against motor malfunction by quickly interrupting the valve driving by the motor.

It is a third object of the present invention to provide a throttle valve actuator which may prevent the throttle valve from biting the body even when the accelerator pedal is rapidly depressed under the condition where the throttle valve is opened at a certain angle by the motor.

SUMMARY OF THE INVENTION

The above-described objects of the present invention are accomplished by providing a throttle valve actuator (100) comprising:

motor means (122);

first spline gear means (115) driven by said motor means (122) to effect a sliding operation thereof along a longitudinal axis of said first spline gear means (115);

second spline gear means (118) operatively connected to throttle valve means (16) and meshed with said first spline gear means (115) so as to convert the sliding operation of said first spline gear means (115) into a first rotating operation of said second spline gear means (118);

housing means (112) for rotatably supporting said second spline gear means (118); and, accelerator pedal means (9) for driving both said second spline gear means (118) and housing means (121) by a second rotating operation, whereby said throttle valve means (16) is driven by both said first and second rotating operations, and said first rotating operation converted from said sliding operation which is produced by said motor means (122) does not give any force to said accelerator pedal means (9) via said housing means (112).

Furthermore, according to the invention, a throttle valve actuator (200) is characterized by comprising:

motor means (223);

clutch means (224) for interruptedly transporting rotation force exerted by said motor means (223);

first spline gear means (215) driven by said rotation force of said motor means (223) while energizing said clutch means (224) to effect a sliding operation thereof along a longitudinal axis of said first spline gear means (215);

second spline gear means (218) operatively connected to throttle valve means (16) and meshed with said first spline gear means (215) so as to convert the sliding operation of said first spline gear means (215) into a first rotating operation of second spline gear means (218);

housing means (221) for rotatably supporting said second spline gear means (218);

first return spring means (222A:222B) connected to said first spline gear means (216) so as to return the same to a neutral position thereof when said clutch means (224) is deenergized;

accelerator pedal means (9) for driving both said second spline gear means (218) and housing means (221) by a second rotating operation, whereby said throttle valve means (16) is driven by both said first and second rotating operations, and said first rotating operation converted from said sliding operation which is produced by said motor means (223) does not give any force to said accelerator pedal means (9) via said housing means (221).

Moreover, to achieve the above-described objects, a throttle valve actuator (300) according to the invention is characterized by comprising:

accelerator pedal means (9);

air pressure type drive means (329) controlled by the accelerator pedal means (9), for sliding a drive rod (335) thereof;

sliding/rotating movement converting means (324,326,327,328) connected to said drive rod (335) and a universal joint (334), for converting sliding force of said drive rod (335) into first rotation force;

output shaft means (321) connected to said sliding-/rotating movement converting means (324,336,327,328), for transporting said first rotation force to throttle valve means (16);

housing means (322) for rotatably supporting said output shaft means (231); and, motor means (340) for rotating said throttle valve means (16) via said housing means (322) and output shaft means (321) by second rotation force, whereby said throttle valve means (16) is driven by both said first and second rotation force, and said second rotation force exerted by said motor means (340) does not give any force to said accelerator pedal means (9) via said sliding/rotating movement converting means (324,236,327,328), universal joint (334), and air pressure type drive means (329).

BRIEF DESCRIPTION OF THE DRAWINGS

The above purpose and other useful and novel features of the present invention will become more readily apparent from the following description in connection with the accompanying in which.

DETAILED DESCRIPTION OF THE PREFERRED EMBODIMENTS

Basic Idea of First Throttle Valve Actuator

A basic idea of the first throttle valve actuator achieving the first object of the present invention as mentioned above is as follows:

The first throttle valve actuator comprises a first slidable spline gear, and a second rotatable spline gear meshing with the first spline gear and also connected to a throttle valve. The first and second spline gears are driven by a motor and an accelerator pedal, respectively.

More specifically, the first spline gear is operated to slide by the driving force of the motor. The sliding operation of the first spline gear enables the second spline gear to be rotated, thereby opening/closing the throttle valve. On the other hand, the second spline gear is rotated in conjunction with an actuator housing by depressing the accelerator pedal to thereby open/-close the throttle valve. Thus, no reaction against rotation of both the spline gears is generated.

Construction of First Throttle Valve Actuator

Figure 1:
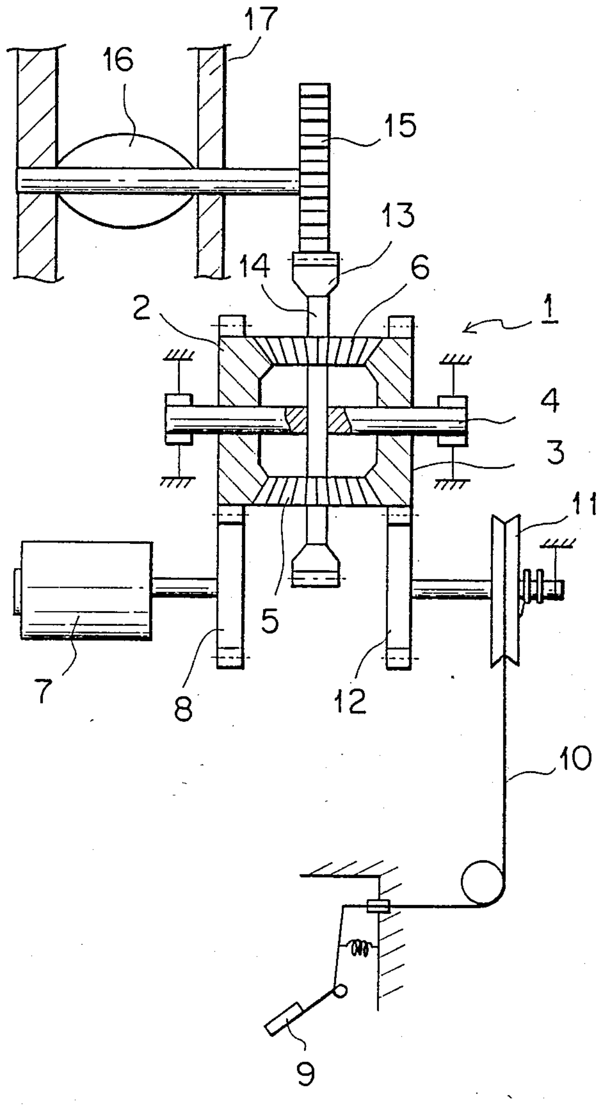
FIG. 1 PRIOR ART
FIG. 1 is a schematic diagram of the conventional throttle valve actuator.
Figure 2:
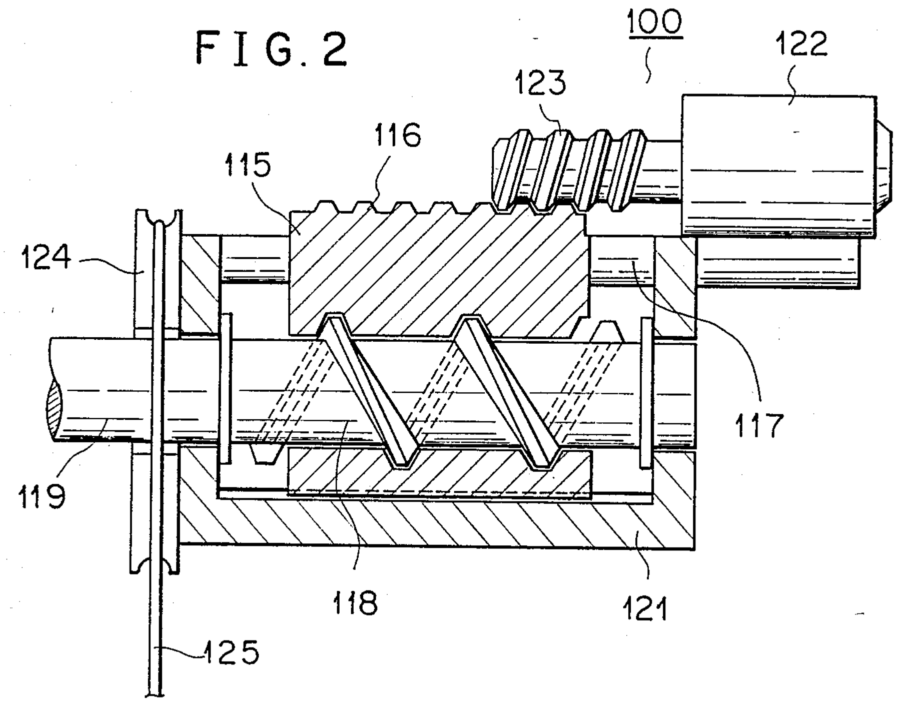
FIG. 2 illustrates a construction of a throttle valve actuator 100 according to a first basic idea of the invention.
Figure 3:
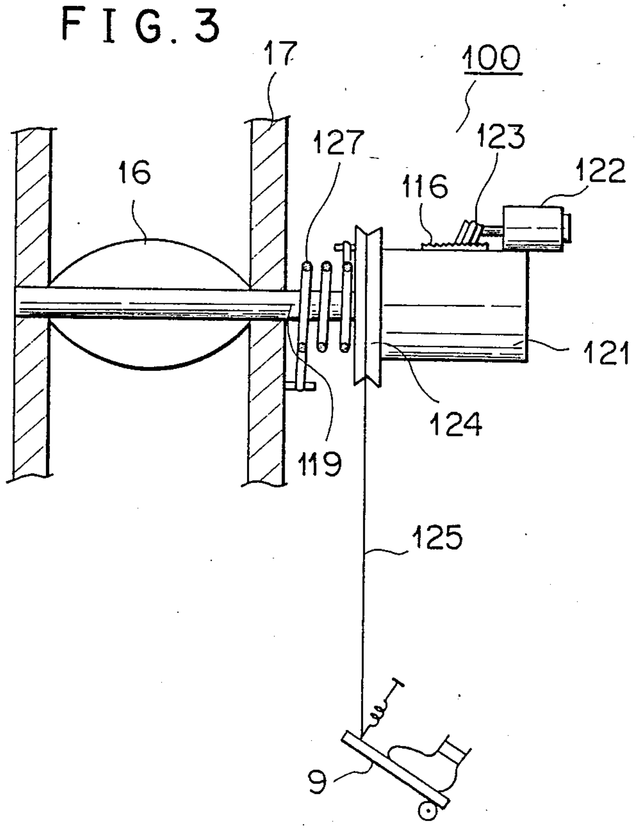
FIG. 3 schematically shows an overall arrangement of the first throttle valve actuator 100 and a throttle valve device.

FIG. 2 shows a construction of a throttle valve actuator 100 according to a first preferred embodiment, and FIG. 3 shows a general arrangement of the throttle valve actuator 100 adapted to a throttle valve system. Referring to FIGS. 2 and 3, reference numeral 115 designates a first spline gear formed on its one side surface with a rack 116. The first spline gear 115 is slidable along a guide 117 in an axial direction of a second spline gear 118 (i.e., in the horizontal direction as viewed in FIG. 2). The second spline gear 118 is meshed with the first spline gear 115, and is rotated thereby. As shown in FIG. 3, an output shaft 119 of the second spline gear 118 is connected to a throttle valve 16. The second spline gear 118 is supported on an actuator housing 121, and is housed with the first spline gear 115 in the housing 121. Reference numeral 122 designates a motor having an output shaft formed with a worm 123 meshing with the rack 116 of the first spline gear 115. A pulley 124 is mounted to the housing 121 coaxially with the second spline gear 118. As shown in FIG. 3, an accelerator wire 125 is wound around the pulley 124 at one end, and it is connected at the other end to an accelerator pedal 9. A return spring 127 is provided to return the pulley 124 to its neutral position when the depression force applied to the accelerator pedal 9 is removed.

Operation of First Throttle Valve Actuator

Operation of the throttle valve actuator 100 according to the first basic idea of the present invention will now be described.

When the accelerator pedal 9 is depressed, the accelerator wire 125 is drawn to rotate the pulley 124 together with the actuator housing 121. Simultaneously, the second spline gear 118 is rotated to thereby rotate the output shaft 119 and open the throttle valve 16. On the other hand, while the motor 122 is driven to slide the first spline gear 115 through the worm 123 and the rack 116, the second spline gear 118 meshing with the first spline gear 115 is rotated to thereby rotate the output shaft 119 and open or close the throttle valve 16. Thus, the driving force of the accelerator wire 125 and the motor 122 are mutually synthesized to be applied to the output shaft 119. Accordingly, when the motor 112 is normally rotated, the driving force of the motor 112 is added to the driving force of the accelerator wire 125. As a result, an opening/closing speed of the throttle valve 16 is accelerated, and a final opening angle of the throttle valve 16 is also increased. To the contrary, when the rotation of the motor 122 is reversed to the rotation of the pulley 124 to be driven by the accelerator wire 125, the opening/closing speed of the throttle valve 16 is retarded, and the final opening angle of the throttle valve 16 is also decreased.

The feature of the first throttle valve actuator is that the driving force of the motor 122 is converted into only force for sliding the first spline gear 115 and simultaneously rotating the second spline gear 118, but this force does not act to rotate the actuator housing 121. Therefore, the driving force of the motor 122 does not interfere with the driving force of the accelerator wire 125. In other words, a car driver does not feel any reaction force through the accelerator pedal 9 while the motor 122 drives the first throttle valve.

Modifications of First Throttle Valve Actuator

Although a sliding mechanism for sliding the first spline gear 115 is constructed by the combination of the worm 123 and the rack 116 in the first preferred embodiment, any other known sliding mechanism may be employed such as a combination of a rack and a pinion, a hydraulic or pneumatic piston, or an electromagnetic solenoid.

Figure 4A:
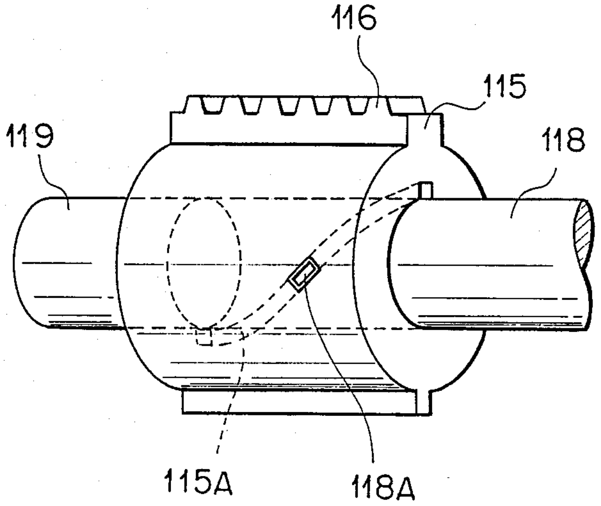
FIGS. 4A, 4B, 5 and 6 schematically illustrate modified constructions of the spline gears employed in the first throttle valva actuator 100 shown in FIG. 1.
Figure 4B:
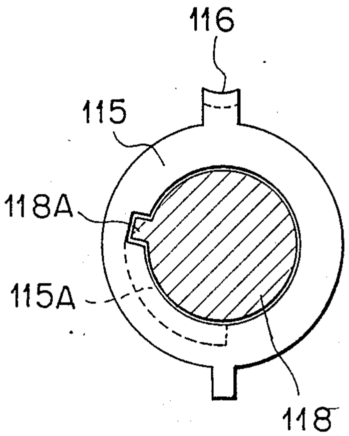

Further, another mechanism for converting the sliding operation of the first spline gear 115 into the rotary operation of the second spline gear 118 is shown in FIGS. 4A and 4B, for example. Referring to FIGS. 4A and 4B, the second spline gear 118 is formed at its outer circumference with an outwardly projecting pin 118A, and the first spline gear 115 is formed at its inner circumference with a screw-shaped groove 115A to be engaged with the pin 118A of the second spline gear 118. With this arrangement, frictional force between the first and second spline gears 115 and 118 is reduced as compared with the first preferred embodiment, thereby effecting the conversion from the sliding operation into the rotary operation with the reduced torque of the motor.

Figure 5:
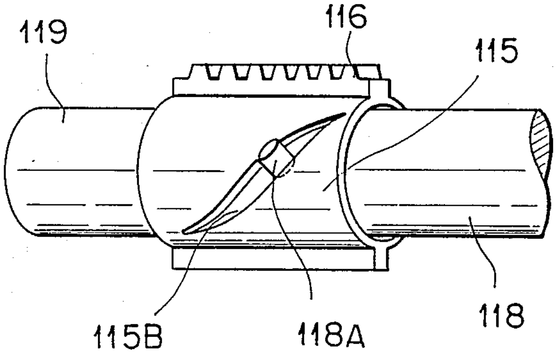
Figure 6:
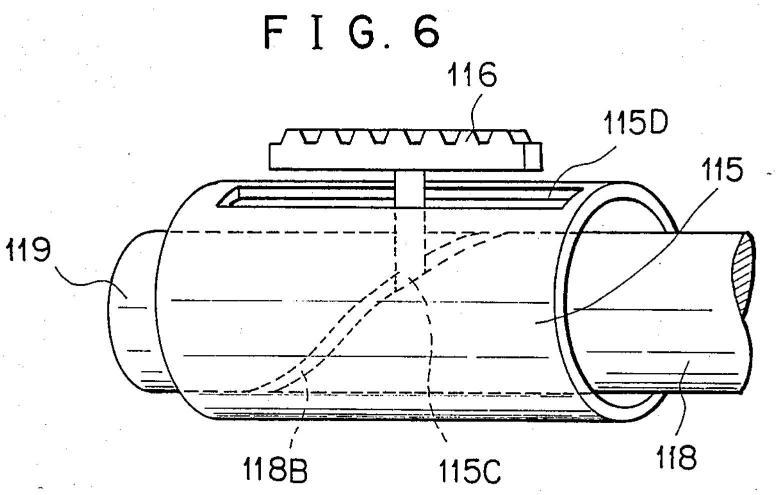

FIGS. 5 and 6 show other exemplary converting mechanisms. Referring to FIG. 5, the second spline gear 118 is formed at its outer circumference with an outwardly projecting pin 118A, and the first spline gear 115 is formed at its cylindrical portion with a screw-shaped slot 115B to be engaged with the pin 118A of the second spline gear 118. This arrangement will exhibit substantially the same effect as the above modification. Referring to FIG. 6, the second spline gear 118 is formed at its outer circumference with a screw-shaped groove 118B, and the first spline gear 115 is formed at its cylindrical portion with a straight axial slot 115D, while the rack portion 116 of the first spline gear 115 is formed with a pin 115C passing through the slot 115D and engaged with the groove 118B of the second spline gear 118.

Further, although the sliding operation of the first spline gear 115 is effected by the motor 122, and the rotary operation of the housing 121 and the second spline gear 118 is effected by the accelerator wire 125 in the first preferred embodiment, the sliding operation of the first spline gear 115 may be effected by the accelerator wire 125, and the rotary operation of the housing

121 and the second spline gear 118 may be effected by the motor 122. Alternatively, both the sliding operation and the rotary operation may be effected by the motor 122.

According to the first throttle valve actuator 100 as mentioned above, the torque for operating the throttle valve is obtained by the synthetic force of the first torque converted from the sliding force of the first spline gear and the second torque of the housing and the second spline gear stored therein. Accordingly, the torque of the output shaft for rotating the throttle valve may be controlled as the sum or difference between the first torque and the second torque. Furthermore, since both the driving force of the motor and the accelerator pedal do not interfere with each other, the first driving force of the motor is not transmitted through the accelerator wire to the accelerator pedal, thereby improving the drive feeling, i.e., drivability.

Basic Idea of Second Throttle Valve Actuator

A basic idea of the second throttle valve actuator achieving the second object of the present invention as mentioned above is as follows:

The second throttle valve actuator comprises a first slidable spline gear, a second rotatable spline gear meshing with the first spline gear, a housing for housing the first and second spline gears, a motor with a clutch for driving the first spline gear, and a return mechanism for returning the first spline gear to its neutral position when driving force of the motor is cut off. The second spline gear is rotated in conjunction with the housing by operating an accelerator pedal.

More specifically, the first spline gear is operated to slide by the driving force of the motor. The sliding operation of the first spline gear gives the second spline gear the torque to thereby open or close the throttle valve. On the other hand, the second spline gear is rotated together with a housing by depressing the accelerator pedal to thereby open or close the throttle valve. Thus, no reaction against rotation of the housing is generated. Further, in the event that the motor fails to operate, the transmission of the driving force of the motor to the first spline gear is cut off by disengaging the clutch, and the first spline gear is returned to the neutral position by the return mechanism. Then, the accelerator pedal is operated to rotate the second spline gear together with the housing and thereby open or close the throttle valve.

Construction of Second Throttle Valve Actuator

Figure 7:
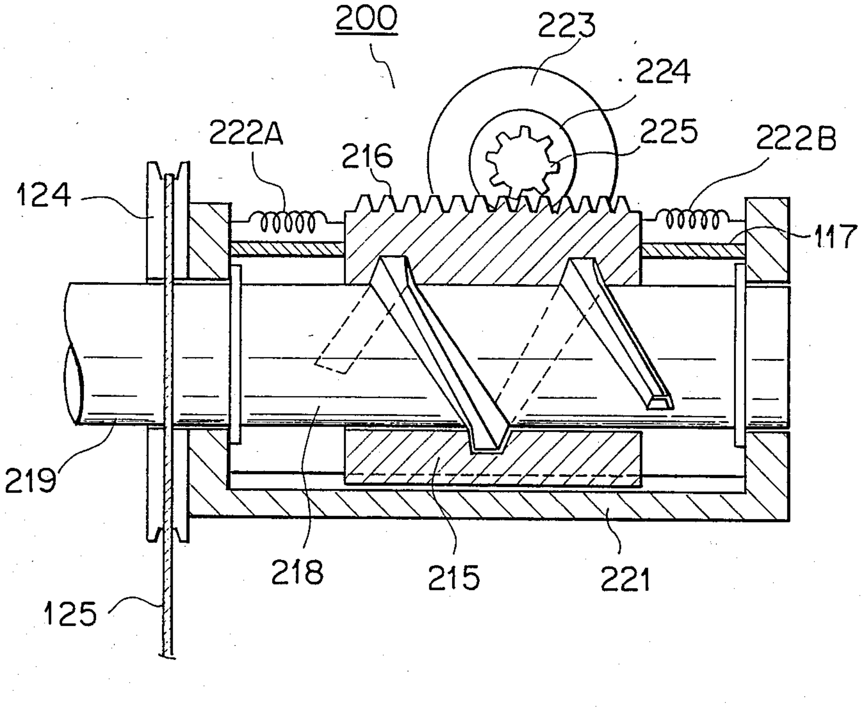
FIG. 7 illustrates a construction of a throttle valve actuator 200 according to a second basic idea of the invention.
Figure 8:
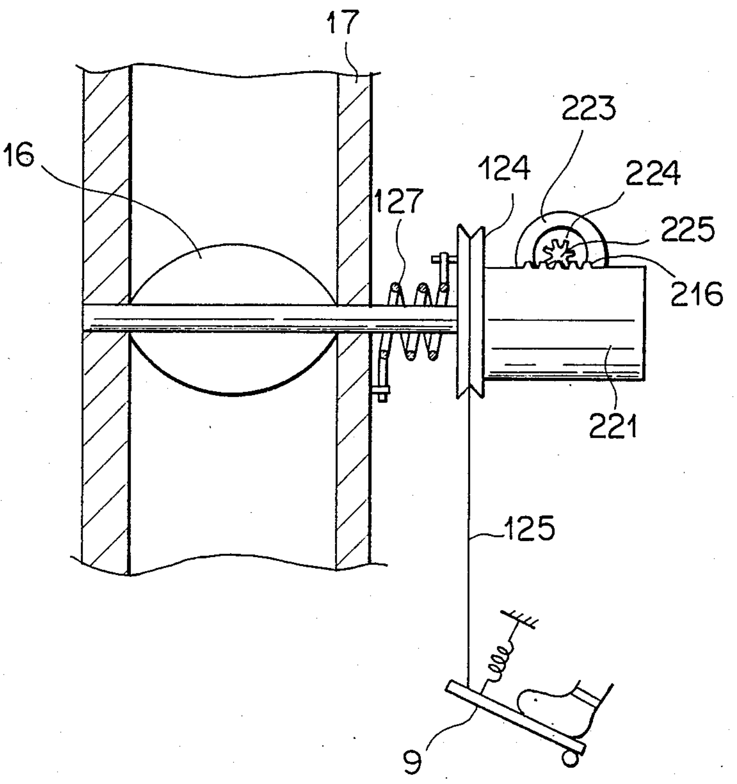
FIG. 8 schematically shows an overall arrangement of the second throttle valve actuator 200 and a throttle valve device.

Referring to FIGS. 7 and 8, a construction of a throttle valve actuator 200 according to a second basic idea of the invention will now be described.

FIG. 7 shows a construction of a throttle valve actuator 200 according to a second preferred embodiment, and FIG. 8 shows a general arrangement of the throttle valve actuator 200 adapted to a throttle valve device.

It should be noted that the same reference numerals shown in FIG. 2 will be employed as those for denoting the same or similar construction in the following figures.

Referring to FIGS. 7 and 8, reference numeral 215 designates a first spline gear formed on its one side surface with a rack 216. The first spline gear 215 is slidable along a guide 117 in an axial direction of a second spline gear 218 (i.e., in the horizontal direction as viewed in FIG. 7). The second spline gear 218 is meshed with the first spline gear 215, and is rotated thereby. As shown in FIG. 8, an output shaft 219 of the second spline gear 218 is connected to a throttle valve 16. The second spline gear 218 is supported to a housing 221, and is housed with the first spline gear 215 in the housing 221. Reference numerals 222A and 222B designate return spring halves as the return mechanism of the second preferred embodiment for oppositely drawing the first spline gear 215 in the sliding direction (i.e., in the horizontal direction as viewed in FIG. 7) by the same spring force. Reference numeral 223 designates a motor with a clutch 224 having an output shaft provided with a pinion 225 meshing with the rack 216 of the first spline gear 215. A pulley 124 is mounted to the housing 221 coaxially with the second spline gear 218. As shown in FIG. 8, an accelerator wire 125 is wound around the pulley 124 at one end, and it is connected at the other end to an accelerator pedal 9. A return spring 127 is provided to return the pulley 124 to its neutral position when depression force applied to the accelerator pedal 9 is removed.

In summary, the featured construction of the second throttle valve actuator 200 is that the torque of the motor 223 is intermittently transmitted through the clutch 224 to the first spline gear 215, and that the return springs 222A and 222B for returning the first spline gear 215 to the neutral position during the malfunction of the motor are connected to the first spline gear 215.

Operation of Second Throttle Valve Actuator

Operation of the throttle valve actuator 200 according to the second basic idea of the invention will now be described.

When the accelerator pedal 9 is depressed, the accelerator wire 125 is drawn to rotate the pulley 124 together with the housing 221. Simultaneously, the second spline gear 218 is rotated to thereby rotate the output shaft 219 and open/close the throttle valve 16. On the other hand, when the motor 223 is driven to slide the first spline gear 215 through the clutch 224, the pinion 225 and the rack 216, the second spline gear 218 meshing with the first spline gear 215 is rotated to thereby rotate the output shaft 219 and open/close the throttle valve 16. Thus, the driving forces of the accelerator wire 125 and the motor 223 are mutually synthesized to be applied to the output shaft 219. Accordingly, when the motor 223 is normally rotated, the driving force of the motor 223 is positively added to the driving force of the accelerator wire 125. As a result, an opening speed of the throttle valve 16 is accelerated, and a final opening degree of the throttle valve 16 is also increased. On the contrary, when the rotation of the motor 223 is reversed to the rotation of the pulley 124 to be driven by the accelerator wire 125, the opening speed of the throttle valve 16 is retarded, and the final opening degree of the throttle valve 16 is also decreased. The driving force of the motor 223 is converted into only a force for sliding the first spline gear 215 and simultaneously rotating the second spline gear 218, but this force does not act to rotate the housing 221. Therefore, the driving force of the motor 223 does not interfere with the driving force of the accelerator wire 125. This operation is substantially the same as that of the first preferred embodiment shown in FIGS. 2 to 6.

Malfunction of Motor for Driving First Spline Gear

In the event that the motor 223 fails to operate, the clutch 224 is deenergized to mechanically cut off the connection between the motor 223 and the pinion 225. As a result, the first spline gear 215 is returned to the neutral position by the opposite spring force of the return springs 222A and 222B. As a result, the throttle valve 16 is rotated in the valve closing direction to thereby reduce a vehicle speed, thus effecting fail-safe operation. Thereafter, the throttle valve 16 can be controlled to be operated by the accelerator pedal 9 only. That is, the normal mechanical operating drive of the vehicle may be carried out by the operation of the accelerator pedal 9 only. Further, runaway of the vehicle may be prevented.

Modifications of Second Throttle Valve Actuator

Although a sliding mechanism for sliding the first spline gear 215 is constructed by the combination of the rack 216 and the pinion 225 in the second preferred embodiment, any other known sliding mechanism may be employed such as a hydraulic or pneumatic piston, or an electromagnetic solenoid.

Figure 9A:
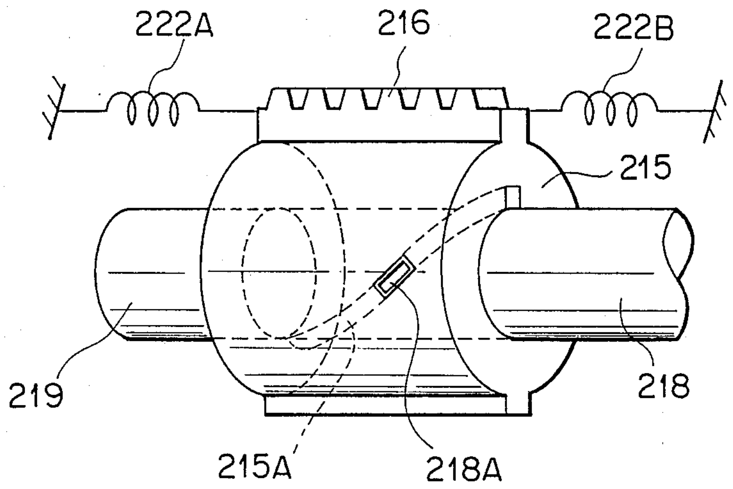
FIGS. 9A, 9B, 10 and 11 schematically represent modified constructions of the spline gears employed in the second throttle valve actuator 200 shown in FIG. 7.
Figure 9B:
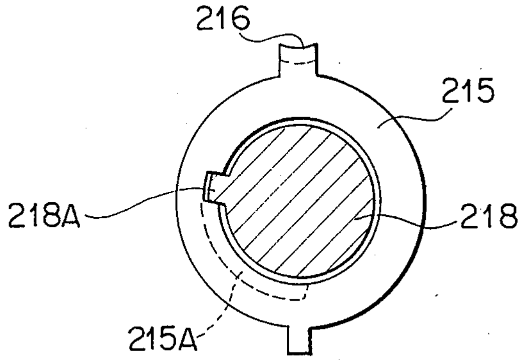

Further, another mechanism for converting the sliding operation of the first spline gear 215 into the rotary operation of the second spline gear 218 is shown in FIGS. 9A and 9B, for example. Referring to FIGS. 9A and 9B, the second spline gear 218 is formed at its outer circumference with an outwardly projecting pin 218A, and the first spline gear 215 is formed at its inner circumference with a screw-shaped groove 215A to be engaged with the pin 118A of the second spline gear 218. With this arrangement, frictional force between the first and second spline gears 215 and 218 is furthermore reduced as compared with the second preferred embodiment shown in FIGS. 7 and 8, thereby effecting the conversion from the sliding operation into the rotary operation with a reduced torque of the motor.

Figure 10:
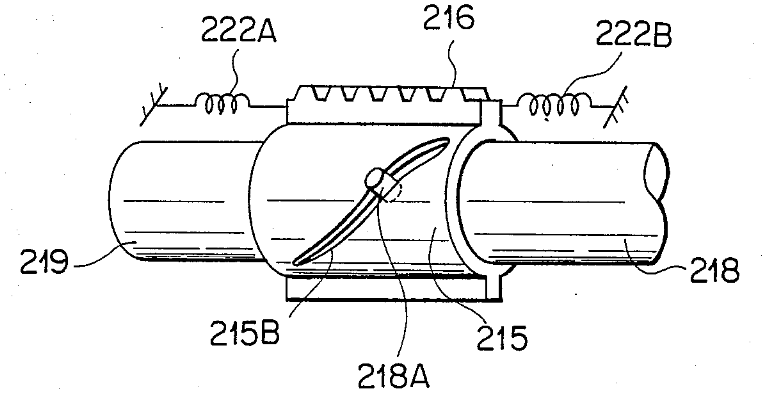
Figure 11:
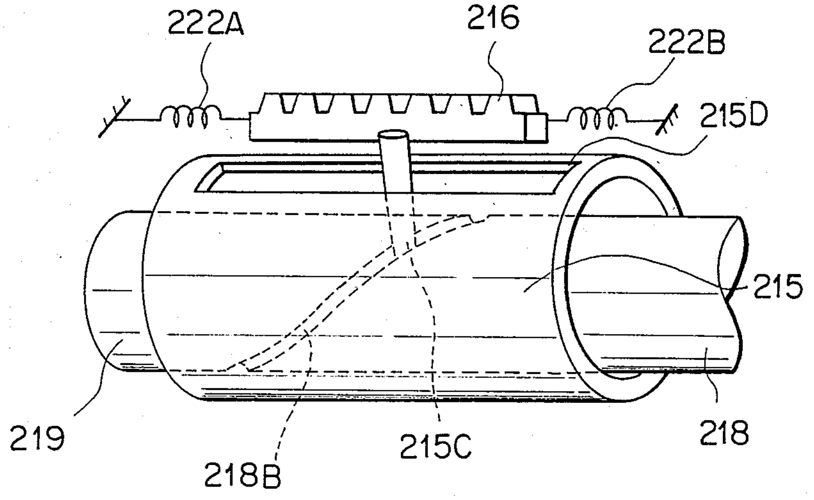

FIGS. 10 and 11 show other exemplary converting mechanisms. Referring to FIG. 10, the second spline gear 218 is formed at its outer circumference with an outwardly projecting pin 218A, and the first spline gear 215 is formed at its cylindrical portion with a screw-shaped slot 215B to be engaged with the pin 218A of the second spline gear 218. This arrangement will exhibit substantially the same effect as the above modification. Referring to FIG. 11, the second spline gear 218 is formed at its outer circumference with a screw-shaped groove 218B and the first spline gear 215 is formed at its cylindrical portion with a straight axial slot 215D, while the rack portion 216 of the first spline gear 215 is formed with a pin 215C passing through the slot 215D and engaged with the groove 218B of the second spline gear 218.

According to the second throttle valve actuator 200 as mentioned above, the torque for operating the throttle valve is obtained by a synthetic force of the first torque converted from the sliding force of the first spline gear, and the second torque of the housing and the second spline gear stored therein. Accordingly, the torque of the output shaft for rotating the throttle valve may be controlled as the sum or difference between the first torque and the second torque. Furthermore, since both the driving forces of the motor and the accelerator pedal do not interfere with each other, the driving force of the motor is not transmitted through the accelerator wire to the accelerator pedal, thereby improving the drive feeling, i.e., drivability. Further, in the event that the motor is brought into malfunction, the driving force of the motor is cut off by the clutch, thereby allowing the throttle valve to be controlled by the operation of the accelerator pedal only. Accordingly, the runaway of the vehicle and the engine stall may be prevented.

Basic Idea of Third Throttle Valve Actuator

A basic idea of the third throttle valve actuator achieving the third object of the present invention as mentioned above is as follows:

The third throttle valve actuator comprises an air pressure type drive device driven to advance and retract by an actuator controller that controls the pressure of the air passages 337 and 338 of the drive device in accordance with a signal from an accelerator sensor 343 which in turn is driven by an accelerator pedal, a frame connected through a universal joint to the air pressure type drive device, a housing for rotatably supporting an output shaft connected to a throttle valve and housing a drum of the output shaft. The frame is operatively connected to the drum, wherein when the frame is advanced or retracted by the air pressure type drive device, the drum is rotated by the frame to thereby open/close the throttle valve. On the other hand, the housing and the output shaft are simultaneously rotated by driving a motor.

With this arrangement, when the air pressure type drive device is advanced or retracted in accordance with the depression force of the accelerator pedal, a linear motion of the frame is converted into a rotary motion of the drum engaged with the frame, thereby rotating the output shaft and opening/closing the throttle valve. On the other hand, when the motor is driven, a driving force of the motor is transmitted through gears to the housing, thereby rotating the housing together with the output shaft and opening/closing the throttle valve. Accordingly, no reaction against the driving force of the accelerator pedal and also the motor is applied thereto. Further, there is no possibility of the throttle valve biting a body upon depression of the accelerator pedal.

Construction of Third Throttle Valve Actuator

Figure 12:
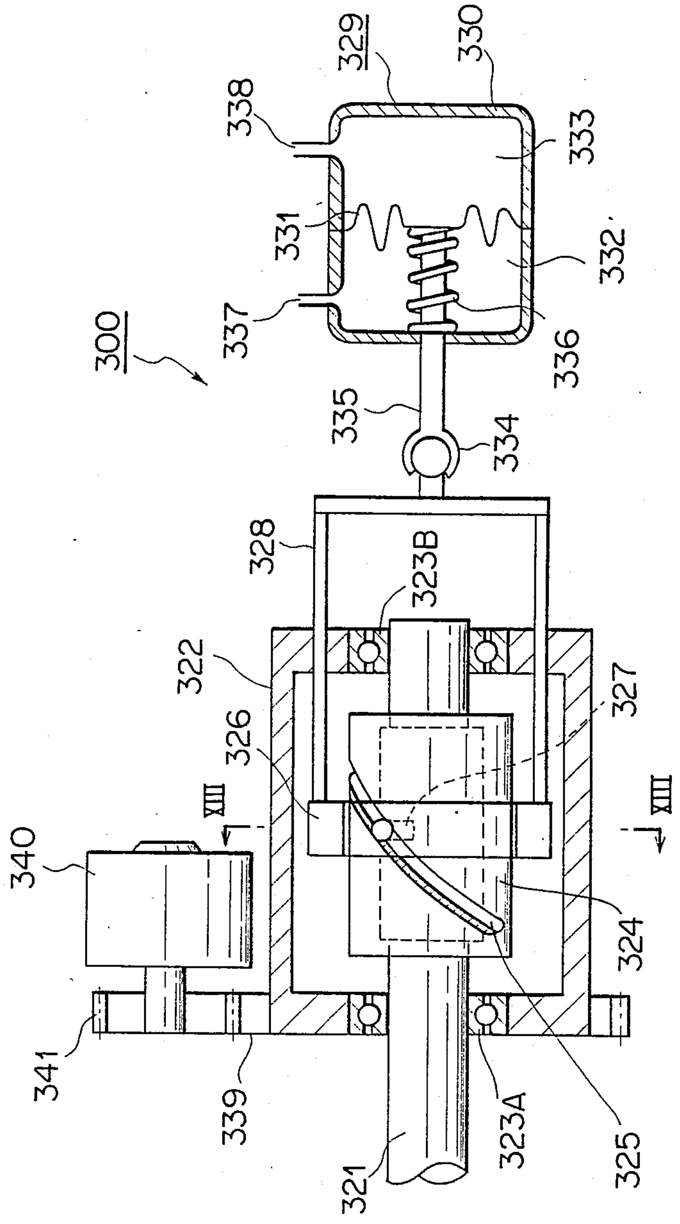
FIG. 12 schematically illustrates a construction of a throttle valve actuator 300 according to a third basic idea of the present invention.
Figure 13:
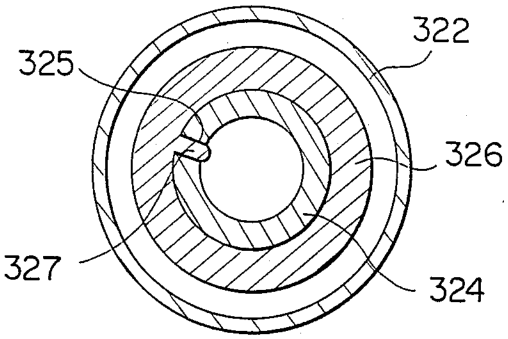
FIG. 13 is a sectional view of the third throttle valve actuator 300 taken along a line XIII—XIII in FIG. 12.

Referring to FIG. 12 which is a sectional view of a third throttle valve actuator 300 according to a third preferred embodiment, reference numeral 321 designates an output shaft connected to a throttle shaft of a throttle valve 16 as shown in FIG. 3. The output shaft 321 is rotatably supported through bearings 323A and 323B to a housing 322. The output shaft 321 is formed with a drum 324 having a spiral groove 325 on the outer circumference thereof. A ring 326 is slidably mounted on the drum 324 in its axial direction (i.e., in the horizontal direction as viewed in FIG. 12). As shown in FIG. 13 (a cross section taken along the line XIII—XIII in FIG. 12), the ring 326 is formed at its inner circumference with an inwardly projecting pin 327 to be engaged with the spiral groove 325 of the drum 324. A frame 328 is connected at its one end to the ring 326, and axially movably extends out of the housing 322. The frame 328 is connected at the other end to an air pressure type drive device 329 cooperating with an accelerator pedal.

The air pressure type drive device 329 includes a casing 330 partitioned into first and second air chambers 332 and 333 by a diaphragm 331, and a rod 335 connected at its one end to the diaphragm 331 and connected at the other end through a universal joint 334 to the frame 328. Return spring 336 is interposed between the casing 330 and the diaphragm 331 so as to return the diaphragm 331 to its neutral position. The casing 330 is provided with air passages 337 and 338 communicated with the first and second air chambers 332 and 333, respectively. Reference numeral 340 designates a motor having an output gear 341 meshing with a gear 339 mounted on the housing 322.

Especially, the air pressure type drive device 329 constitutes an essential part of the third throttle valve actuator 300.

Figure 14:
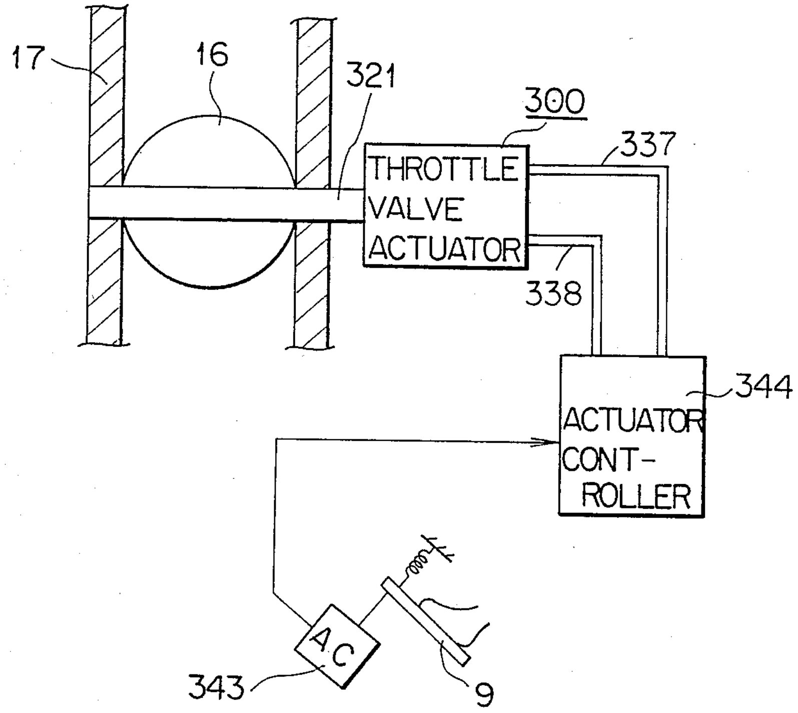
FIG. 14 schematically illustrates an arrangement of the third throttle valve actuator 300 and a throttle valve device.

Referring to FIG. 14 which shows an arrangement of the throttle valve actuator 300 adapted to an engine so as to control a throttle valve 16, the throttle valve actuator 300 is connected to an actuator controller 344 for controlling the throttle valve actuator 300 upon receipt of a signal from an accelerator sensor 343 for detecting a depression quantity of an accelerator pedal 9.

Operation of Third Throttle Valve Actuator

Operation of the throttle valve actuator 300 according to the third basic idea of the invention will now be described with reference to FIGS. 12 to 14.

When the motor 340 is in an inoperative mode under the control of the actuator controller 344 shown in FIG. 14, and air in the first air chamber 332 is extracted from the air passage 337 of the drive device 329, a pressure differential is generated between the first and second air chambers 332 and 333. As a result, the rod 335 is leftwardly urged by the diaphragm 331 to a position where the pressure differential balances a biasing force of the return spring 336, thereby advancing the frame 328 and the ring 326 leftwardly, as viewed in FIG. 12. As the pin 327 of the ring 326 is engaged with the spiral groove 325 of the drum 324, the drum 324 is rotated by the advancing of the ring 326 to thereby rotate the output shaft 321 and open the throttle valve 16 (See FIG. 14). To the contrary, when air pressure in the second air chamber 333 is made less than the air pressure in the first air chamber 332, the diaphragm 331 is moved rightwardly as viewed in FIG. 12 to thereby retract the rod 335 and the frame 328 rightwardly as viewed in FIG. 12. As a result, the drum 324 is reversely rotated to close the throttle valve 16 via the output shaft 321.

On the other hand, when the motor 340 is driven under the control of the actuator controller 344, the housing 322 is rotated through the gears 341 and 339. As a result, the output shaft 321 is rotated together with the housing 322 to control the operation of the throttle valve 16. That is, a total rotational angle of the output shaft 321 results in the sum or difference between a rotational angle by the drive device 329 and a rotational angle by the motor 340. Further, since the frame 328 is connected through the universal joint 334 to the rod 335 of the drive device 329, the torque of the housing 322 is not transmitted to the drive device 329.

In summary, the third throttle valve actuator 300 exhibits the following effects. First, since the air pressure type drive device 329 is employed as a drive device for driving the throttle valve 16, a cushioning effect may be exhibited when the throttle valve 16 actually contacts the body 17 upon depression of the accelerator pedal 9, thereby preventing the throttle valve 16 from biting the body 17. Second, in the event that the actuator controller 344 is brought into malfunction, the air in the first and second air chambers 332 and 333 of the drive device 329 is released to the atmosphere to return the diaphragm 331 to the neutral position. Accordingly, the throttle valve may be manually controlled to ensure the safety drive of the vehicle.

Modifications of Third Throttle Valve Actuator

Figure 15:
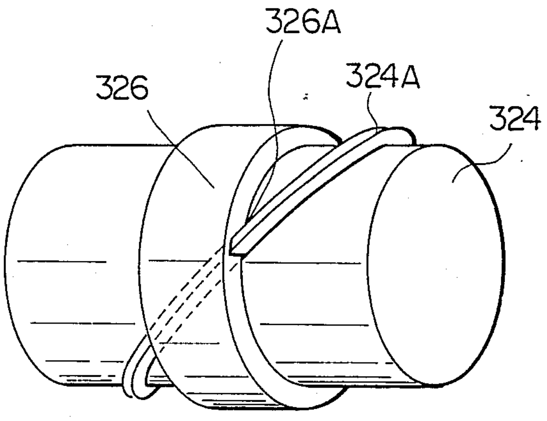
FIGS. 15 and 16 schematically illustrate modified constructions of the third throttle valve actuator 300 shown in FIG. 12.
Figure 16:
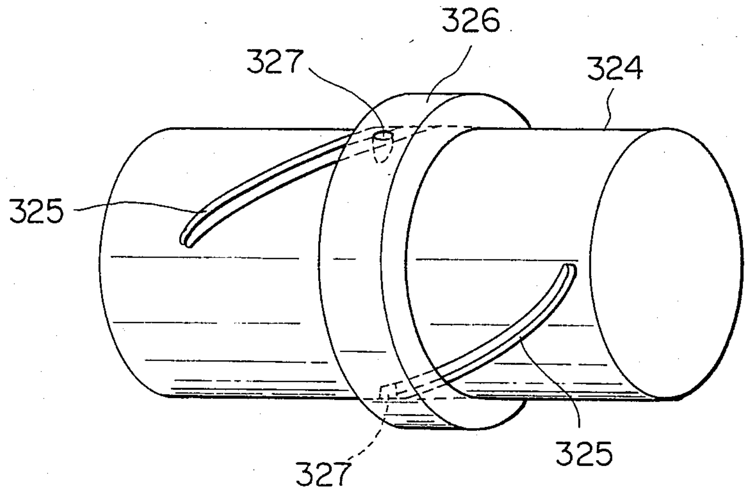

Although the housing 322 is rotated by the motor 340 in the above third preferred embodiment, it may be driven directly by a wire connected to the accelerator pedal 9. Further, while a mechanism for converting a linear motion into a rotary motion is established by the combination of the drum 324 and the ring 326 in the above third preferred embodiment, any other mechanisms may be employed as shown in FIGS. 15 and 16, for example. Referring to FIG. 15, the drum 324 is formed at its outer circumference with a spiral ridge 324A, and the ring 326 is formed at its inner circumference with an oblique groove 326A to be engaged with the spiral ridge 324A of the drum 324. Referring to FIG. 16, the drum 324 is formed at its outer circumference with a plurality of spiral grooves 325, and the ring 326 is formed at its inner circumference with a plurality of inwardly projecting pins 327 to be engaged with the spiral grooves 325 of the drum 324.

According to the third throttle valve actuator 300 of the present invention, the linear motion of the rod of the air pressure type drive device is converted into the rotary motion of the output shaft to thereby open/close the throttle valve. On the other hand, the output shaft is also rotated with the housing to be driven by the motor, thereby opening or closing the throttle valve. Accordingly, both the driving forces of the air pressure type drive device and the motor do not interfere with each other to improve the drive feeling or drivability. Further, since the air pressure type drive device is employed as a drive device for driving the throttle valve, a cushioning effect may be exhibited when the throttle valve contacts the body upon depression of the accelerator pedal, thereby preventing the throttle valve from biting the body. Moreover, in the event that the actuator controller is brought into malfunction, the air in the first and second air chambers of the drive device is released to the atmosphere to return the diaphragm to the neutral position. Accordingly, the throttle valve may be manually controlled to ensure the safety of the vehicle.

What is claimed is:

1. A throttle valve actuator comprising:

accelerator pedal means;

air pressure type drive means adapted to be controlled by the accelerator pedal means, for sliding a drive rod thereof;

sliding/rotating movement converting means connected to said drive rod and a universal joint, for converting sliding force of said drive rod into first rotation force;

output shaft means connected to said sliding/rotating movement converting means, for transporting said first rotation force to throttle valve means;

housing means for rotatably supporting said output shaft means; and, motor means for rotating said throttle valve means via said housing means and output shaft means by second rotation force, whereby said throttle valve means is driven by both said first and second rotation force, and said second rotation force exerted by said motor means does not give any force to said accelerator pedal means via said sliding/rotating movement converting means universal joint, and air pressure type drive means.

2. A throttle valve actuator as claimed in claim 1, wherein said sliding/rotating movement converting means includes:

a drum connected to said output shaft means and having a helical groove;

a ring having a pin engageable with said helical groove of said drum; and, a frame one end of which is connected to said ring and the other end of which is connected via said universal joint to said air pressure type drive means.

3. A throttle valve actuator as claimed in claim 1, wherein said sliding/rotating movement converting means includes:

a drum connected to said output shaft means and having a helical ridge;

a ring having a helical groove engageable with said helical ridge of said drum under spline engagement; and, a frame one end of which is connected to said ring and the other end of which is connected via said pressure type drive means.

4. A throttle valve actuator as claimed in claim 1, wherein said sliding/rotating movement converting means includes:

a drum connected to said output shaft means and having a plurality of helical grooves;

a ring having a pin engageable with said plurality of helical grooves of said drum; and, a frame one end of which is connected to said ring and the other end of which is connected via said universal joint to said air pressure type drive means.

5. A throttle valve actuator as claimed in claim 1, wherein said air pressure type drive means is constructed of a first air chamber, a second air chamber, a diaphragm for separating said first and second air chambers and connected to said drive rod, and a balancing spring provided on said drive rod for giving balancing spring force to said diaphragm, whereby said diaphragm is returned to its neutral position by said balancing spring force when both said first and second air chambers are opened to atomospheric pressure.

* * * * *